United States Patent [19]

DePaul et al.

[11] 4,225,453
[45] Sep. 30, 1980

[54] STABILIZATION OF FLAME RETARDANT PREMIX FOR POLYURETHANE

[75] Inventors: Harry V. DePaul, Eddystone; David C. Fondots, Chalfont; Rocco L. Mascioli, Media, all of Pa.; John R. Panchak, Wilmington, Del.

[73] Assignee: Air Products and Chemicals, Inc., Allentown, Pa.

[21] Appl. No.: 921,422

[22] Filed: Jul. 3, 1978

[51] Int. Cl.$^3$ .......................... C08G 18/8; B01J 27/02; C08J 9/02
[52] U.S. Cl. ..................... 252/182; 252/8.1; 260/18 TN; 521/118; 521/121; 521/129
[58] Field of Search ............... 252/182, 8.1; 260/18 TN; 521/117, 121, 118, 129, 130, 131, 171

[56] References Cited

U.S. PATENT DOCUMENTS

| | | | |
|---|---|---|---|
| 3,095,386 | 6/1963 | Hudson | 521/130 |
| 3,211,674 | 10/1965 | Sandridge | 260/18 TN |
| 3,248,348 | 4/1966 | Picchola et al. | 260/18 TN |
| 3,884,849 | 5/1975 | Molbart | 521/121 |
| 3,978,011 | 8/1976 | Molbert | 521/121 |
| 3,980,579 | 9/1976 | Syrop et al. | 252/182 |
| 4,018,724 | 4/1977 | Cobbledick | 521/121 |
| 4,020,024 | 4/1977 | Walraevens | 521/171 |

Primary Examiner—Benjamin R. Padgett
Assistant Examiner—Irwin Gluck
Attorney, Agent, or Firm—Richard A. Dannells, Jr.; E. Eugene Innis

[57] ABSTRACT

The storage stability of otherwise unstable premix compositions for flame retardant rigid polyurethane foams containing in the premix a chlorinated polyether polyol and a tertiary amine catalyst, is enhanced by incorporation into the premix a synergistic combination of an organic sulfur compound and an unsaturated carbon compound. The preferred sulfur compound is thiourea; among the preferred unsaturated carbon compounds are unsaturated terpenes such as allo-ocimene and unsaturated higher fatty acids such as tall oil fatty acids and mono-, di-, and trienic $C_{18}$ acids.

20 Claims, No Drawings

STABILIZATION OF FLAME RETARDANT PREMIX FOR POLYURETHANE

BACKGROUND OF THE INVENTION

1. Field of the Invention

The present invention relates to formulations for flame retardant rigid polyurethane foams and is particularly concerned with improving the storage stability of the premix composition employed in the production of these foams.

Premix compositions for rigid flame retardant polyurethane foams containing chlorinated polyols, are unstable at room or elevated temperature when such premix also contains a tertiary amine catalyst. Apparently decomposition of the chlorinated polyol gives rise to HCl which forms a tertiary amine hydrochloride salt and deactivates the catalyst.

Among the objects of the present invention, accordingly, is to stabilize such premix compositions and extend the desired useful storage life thereof.

2. Prior Art

It is known to incorporate various drying oils or tall oil as such or in modified form (oxidized or hydroxylated) in polyurethane foams, as disclosed, for example, in U.S. Pat. Nos. 3,095,386 and 3,211,674.

It is also known to incorporate flame retardants into polyurethane foam formulations, among which are halogenated polyesters. According to the disclosure in U.S. Pat. No. 3,248,348, the stated difficulties of mixing such halogenated polyesters with polyisocyanates employed in polyurethane formulations, are overcome by using instead of the previous halogenated esters, hydroxylated tall oil esters which are halogenated.

It is also known to use various sulfur compounds in polyurethane formulations either for specified particular purposes or in general as included among the kinds of active hydrogen containing compounds (thiols) that can be employed to react with polyisocyanates.

U.S. Pat. Nos. 3,884,849 and 3,978,011 disclose the use of zinc salts of various carboxylic acids, including those of higher fatty acids, or zinc salts of dithiocarbamic acids as agents to prevent discoloration of large buns or slabs of low density flexible and semiflexible polyurethane foams formed from mixtures containing as flame retardants polyvinyl chloride together with zinc and antimony oxides. Also suggested for similar use are the zinc sulfide salts of benzothiazole and naphthothiazole (U.S. Pat. No. 4,018,724).

SUMMARY OF THE INVENTION

It has now been found, in accordance with the present invention, that the premature deactivation of the tertiary amine catalyst contained in the premix for rigid polyurethane foams in the presence of halogenated flame retardant polyols, can be reduced or largely avoided and the useful storage life of such premix extended, by inclusion therein of a stabilizing amount of a synergistic combination of an organic sulfur compound and an unsaturated carbon compound, particularly one selected from among unsaturated higher fatty acids, unsaturated higher fatty and polyester alcohols and unsaturated hydrocarbon compounds.

The premix composition employed in practice of the invention includes in addition to the aforesaid activity stabilizer for the tertiary amine catalyst and chlorinated polyol, the usual blowing agent and surfactant cell-stabilizer. To such premix, the required di- or polyisocyanate is subsequently added to initiate the isocyanate-polyol reaction and blowing to produce the desired rigid flame retardant cellular polyurethane.

SPECIFIC EMBODIMENTS

Among the examples of sulfur compounds that can be employed together with unsaturated carbon compound in practice of the invention are included: thiourea, mixed alkylthioureas, tetramethylthiourea, disulfide; thiocarbamates, including, for example, dithiocarbamates and dimethylaminoethyl thiocarbamate and salts of thiocarbamates such as zinc-dimethyldithiocarbamate. Such sulfur compounds, acting alone, do not obtain the desired stabilizing of the polyurethane premix but must be used together with one or more of the unsaturated carbon compounds.

The unsaturated carbon compound employed preferably as one containing in range of 8 to 18 carbon atoms in the olefinic hydrocarbon chain and selected from among polyolefins, unsaturated terpenes and unsaturated higher fatty acids or glyceride esters of such unsaturated higher fatty acids (fats and oils). Examples of these include: allo-ocimene, dicyclopentadiene, alpha methyl styrene, low molecular weight polybutadienes, alpha pinene, beta pinene, hexatriene; oleic, linoleic, linolenic and sorbic acids; tall oil fatty acids (TOFA) and eleo-stearic acid; commercial drying oils such as linseed, olive, cottonseed, corn, soybean, oiticica, tung, perilla and safflower. These unsaturated compounds, in the absence of the sulfur compound, do not obtain the desired stabilization of the indicated polyurethane premix compositions. Among the examples of other unsaturated carbon compounds that may be employed in combination with the sulfur compounds are unsaturated fatty alcohols such as dimethyl hexyne diol and unsaturated polyester alcohols such as the product formed by reacting maleic anhydride with a glycol including ethylene glycol, propylene glycol, diethylene glycol, dipropylene glycol, butane diol glycol, 1,4-cyclohexane glycol and higher homologs thereof.

Any of the known tertiary amine catalysts used in the preparation of rigid cellular polyurethanes or combinations of these may be employed in the premix compositions of the invention. Particular examples of these include triethylene diamine, dimethyl ethanolamine, dimethylcyclohexylamine, triethylamine, N-methyl morpholine, N-ethyl morpholine, dimethyl piperazine, tetramethyl propane diamine; and other tertiary amine catalysts hereinafter described.

The surfactant employed as a cell stabilizer may be of the silicone oil type such as polysiloxane-polyoxyalkylene block copolymers or polydimethyl siloxane; or the type obtained by polymerization of dibutyl maleate monomer and an N-vinyl pyrrolidone monomer compound in a polyol polymerization medium (U.S. Pat. No. 3,746,663).

Any of the usual blowing agents generally employed in rigid polyurethane formulations may be employed, preferably those of the halohydrocarbon type, such as trichloro monofluoromethane.

EXAMPLE 1

A series of experimental runs were made to determine the effectiveness of various additives for stabilizing the activity of the catalyst in the premix for fire retardant rigid polyurethane foams. In all of these runs the same basic premix composition was employed, except for amine catalyst used and the indicated additives shown in Tables 2 and 3.

TABLE 1

|  |  | pbw |
|---|---|---|
| Basic Premix | Thermolin ™ RF-230[1] | 100 |
|  | Poly G ®, 70-600[2] | 20 |
|  | Genetron ® R11S BA[3] | 45 |
|  | LK-221 ® or DC 193[4] | 1.5 |
|  | Amine catalyst ± stabilizer additives | (as indicated) |
| Isocyanate | Mondur ® MR[5] | 134 (later added) |

(1) A reactive chlorinated polyether polyol supplied by Olin Corporation Designed Products Division for use in production of flame retardant rigid polyurethanes. The product contains 47% by weight chemically bound chlorine and has a hydroxyl number of 365±10 (mg KOH/gm) and a viscosity of 100,000 cps at 25° C.

(2) An amino-polyol supplied by the above-named Olin division specifically designed to reduce surface friability in rigid urethane foams based on Thermolin RF-230. It has a hydroxyl number of 600±10 (mg KOH/gm) and a viscosity of 280 cps at 25° C.

(3) Trichloromonofluoromethane blowing agent.

(4) LK-221 is a polyurethane cell stabilizer surfactant supplied by Air Products and Chemicals, Inc. It is a liquid polymer-polyol product comprising the copolymer of N-vinyl pyrrolidone and dibutyl maleate polymerized in a trifunctional polyol. DC-193 is a silicone type surfactant supplied by Dow-Corning Corporation comprising polysiloxane polyoxyalkylene block copolymers such as described in U.S. Pat. Nos. 2,834,748 and 2,917,480.

(5) A polymethylene polyphenyl isocyanate supplied by Mobay Chemical Co. containing 32% of NCO groups, having an equivalent weight of 132.

The premix compositions were stored for indicated periods at elevated temperature and loss in activity determined after admixture of the reacting isocyanate to form the foamed polyurethane. The results are reported in Tables 2 and 3 below, comprising premix compositions (a) containing tertiary amine catalyst compositions free of activity-stabilizing additives (Runs #1 and #6), (b) with addition of only an unsaturated carbon compound (Runs #2 and #9), (c) with addition of only a sulfur compound (Runs #3 and #7), and (d) with addition of both a sulfur compound and an unsaturated carbon compound (Runs #4, #5, #8, #10, #11, #12 and #13). These premix compositions were stored at 45°–47° C. for the periods indicated, previous to admixture of the isocyanate.

TABLE 2

| | Run #1 | | | Run #2A | | | Run #2B | | |
|---|---|---|---|---|---|---|---|---|---|
| CATALYST ± ADDITIVE COMPOSITION | DMEA[6] | pbw 3.7 | | DMEA + Allo-ocimene | pbw 3.5 3.0 | | DMEA + Allo-ocimene | pbw 3.5 5.0 | |
| | Initial | 8 days | 15 days | Initial | 8 days | 15 days | Initial | 8 days | 14 days |
| Cream time (secs.) | 9 | 11 | 16 | 11 | 12 | 16 | 12 | 13 | 14 |
| Gel time (secs.) | 31 | 36 | 49 | 34 | 35 | 45 | 36 | 38 | 39 |
| Tack-free (secs.) | 43 | 49 | 71 | 42 | 44 | 57 | 44 | 43 | 46 |
| Rise (secs.) | 59 | 71 | 90 | 66 | 74 | 91 | 77 | 73 | 90 |
| Activity loss, % | | | | | | | | | |
| Cream time | — | 22 | 78 | — | 9 | 45 | — | 8 | 17 |
| Gel free time | — | 16 | 58 | — | 3 | 32 | — | 6 | 8 |
| Tack-free time | — | 14 | 65 | — | 5 | 36 | — | 0 | 7 |
| Rise time | — | 20 | 53 | — | 12 | 38 | — | 0 | 17 |

| | Run #3 | | | Run #4 | | | Run #5 | | |
|---|---|---|---|---|---|---|---|---|---|
| CATALYST ± ADDITIVE COMPOSITION | DMEA + Thiourea | pbw 3.5 0.2 | | DMEA + Thiourea + allo-ocimene | pbw 3.5 0.2 5.0 | | DMEA + Thiourea + linolenic acid | pbw 3.5 0.2 5.0 | |
| | Initial | 8 days | 15 days | Initial | 8 days | 15 days | 2 days | 10 days | 18 days |
| Cream time (secs.) | 10 | 12 | 14 | 10 | 10 | 10 | 16 | 12 | 14 |
| Gel time (secs.) | 33 | 38 | 49 | 33 | 33 | 34 | 45 | 40 | 44 |
| Tack-free (secs.) | 44 | 59 | 71 | 43 | 44 | 47 | 61 | 44 | 59 |
| Rise (secs.) | 62 | 76 | 90 | 67 | 69 | 68 | 106 | 81 | 95 |
| Activity loss, % | | | | | | | | | |
| Cream time | — | 20 | 40 | — | 0 | 0 | — | 0 | 0 |
| Gel time | — | 15 | 48 | — | 0 | 3 | — | 0 | 0 |
| Tack-free time | — | 34 | 61 | — | 2 | 9 | — | 0 | 0 |
| Rise time | — | 23 | 45 | — | 3 | 1 | — | 0 | 0 |

[6]DMEA is dimethylethanolamine

TABLE 3

| | Run #6 | | | Run #7 | | | Run #8 | | | Run #9 | | |
|---|---|---|---|---|---|---|---|---|---|---|---|---|
| CATALYST ± ADDITIVE COMPOSITION | DABCO[7] R-8020 | pbw 2.5 | | DABCO R-8020 + Thiourea | pbw 2.5 0.1 | | DABCO R-8020 + Thiourea + Allo-ocimene | pbw 2.5 0.1 3.0 | | DABCO R-8020 + Allo-ocimene | pbw 2.5 3.0 | |
| | Initial | 7 days | 14 days | Initial | 7 days | 14 days | Initial | 7 days | 14 days | Initial | 7 days | 14 days |
| Cream time (secs.) | 11 | 13 | 17(18) | 11 | 13 | 18 | 14 | 15 | 18 | 12 | 14 | 18 |
| Gel time (secs.) | 32 | 37 | 47 | 32 | 37 | 47 | 38 | 44 | 53 | 33 | 40 | 49 |

TABLE 3-continued

|  | Run #7 | | | Run #8 | | | Run #9 | | | | | |
|---|---|---|---|---|---|---|---|---|---|---|---|---|
| Tack-free (secs.) | 39 | 47 | 64 | 37 | 46 | 60 | 45 | 57 | 75 | 40 | 49 | 67 |
| Rise (secs.) | 70 | 75 | 94 | 68 | 74 | 92 | 75 | 90 | 110 | 69 | 75 | 99 |
| Activity Loss, % | | | | | | | | | | | | |
| Cream time | — | 18 | 55(64) | — | 18 | 64 | — | 7 | 29 | — | 17 | 50 |
| Gel time | — | 16 | 47 | — | 16 | 47 | — | 16 | 39 | — | 21 | 48 |
| Tack-free time | — | 21 | 64 | — | 24 | 62 | — | 27 | 67 | — | 23 | 68 |
| Rise time | — | 7 | 34 | — | 9 | 32 | — | 33 | 47 | — | 9 | 43 |

|  | Run #10 | | | Run #11 | | | Run #12 | | | Run #13 | | |
|---|---|---|---|---|---|---|---|---|---|---|---|---|
| | | | pbw | | | pbw | | | pbw | | | pbw |
| CATALYST + ADDITIVE COMPOSITION | DABCO R-8020 + Thiourea + Oleic Acid | | 2.5 0.1 5.0 | DABCO R-8020 + Thiourea + Linoleic Acid | | 2.5 0.1 5.0 | DABCO R-8020 + Thiourea + Linolenic Acid | | 2.5 0.1 5.0 | DABCO R-8020 + Thiourea + TOFA[8] | | 2.5 0.1 5.0 |
| | Initial | 7 days | 14 days | Initial | 7 days | 14 days | 2 days | 10 days | 18 days | Initial | 7 days | 14 days |
| Cream time (secs.) | 15 | 14 | 17 | 15 | 13 | 16 | 16 | 14 | 16 | 15 | 14 | 15 |
| Gel time (secs.) | 46 | 46 | 54 | 44 | 44 | 54 | 47 | 48 | 54 | 44 | 45 | 53 |
| Tack-free (secs.) | 59 | 52 | 59 | 58 | 54 | 61 | 65 | 57 | 70 | 56 | 52 | 61 |
| Rise (secs.) | 88 | 88 | 110 | 87 | 92 | 108 | 95 | 93 | 110 | 89 | 84 | 110 |
| Activity loss, % | | | | | | | | | | | | |
| Cream time | — | 0 | 13 | — | 0 | 7 | — | 0 | 0 | — | 0 | 0 |
| Gel time | — | 0 | 17 | — | 0 | 23 | — | 2 | 15 | — | 2 | 25 |
| Tack-free time | — | 0 | 0 | — | 0 | 5 | — | 0 | 7 | — | 0 | 9 |
| Rise time | — | 0 | 25 | — | 6 | 24 | — | 0 | 16 | — | 0 | 24 |

[7]DABCO R-8020 is a mixture of tertiary amine catalysts supplied by Air Products and Chemicals, Inc. comprised of 80 parts dimethylethanolamine and 20 parts triethylene diamine.
[8]TOFA is a mixture of tall oil fatty acids which is described more completely below The foregoing test runs were carried out after storage at elevated temperatures to accelerate activity loss. Storage at ambient temperature conditions results in a corresponding lower rate of decline in activity of the premix. The final rigid foam products obtained from the premix compositions tested, which contained both the sulfur compound and unsaturated carbon compound, retained the expected fire retardancy and displayed no adverse effects as a result of these additives.

EXAMPLE 2

The effect of storage of the activity-stabilized premix at about room temperature or somewhat above is demonstrated by the following series of runs, the results of which are reported in Tables 4 and 5 below.

The basic premix compositions tested was the same as that employed in Example 1 (see Table 1 above), the particular catalyst and additives contained are identified in Tables 4 and 5.

TABLE 4

|  | Run #14 | | | | Run #15 | | | |
|---|---|---|---|---|---|---|---|---|
| | | | | pbw | | | | pbw |
| CATALYST AND ADDITIVES | DABCO R8020 + Thiourea + TOFA | | | 2.5 0.1 5.0 | DMEA + Thiourea + TOFA | | | 3.5 0.2 5.0 |
| | STORED AT ROOM TEMPERATURE | | | | STORED AT ROOM TEMPERATURE | | | |
| | Initial | 19 days | 41 days | 132 days | Initial | 19 days | 41 days | 132 days |
| Cream time (secs.) | 15 | 13 | 13 | 20 | 14 | 12 | 12 | 18 |
| Gel Time (secs.) | 43 | 40 | 39 | 53 | 37 | 35 | 35 | 44 |
| Tack-free (secs.) | 58 | 57 | 52 | 75 | 57 | 49 | 44 | 66 |
| Rise (secs.) | 91 | 91 | 89 | 112 | 92 | 88 | 80 | 104 |
| Activity loss, % | | | | | | | | |
| Cream time | — | 0 | 0 | 33 | — | 0 | 0 | 22 |
| Gel time | — | 0 | 0 | 33 | — | 0 | 0 | 19 |
| Tack-free time | — | 0 | 0 | 29 | — | 0 | 0 | 16 |
| Rise time | — | 0 | 0 | 23 | — | 0 | 0 | 13 |

The same premix composition of Run #14 using DABCO R-8020 but without the stabilizer sustained a calculated average loss of activity on the order of over 100% when stored at room temperature for 118 days.

The same premix composition of Run #15 using DMEA but without the stabilizer lost an average of about 60% of the original activity when stored for 118 days at room temperature.

TABLE 5

|  | Run #16 | | | Run #17 | | |
|---|---|---|---|---|---|---|
| | | | pbw | | | pbw |
| CATALYST AND ADDITIVES | DABCO R-8020 Thiourea TOFA | | 2.5 0.1 5.0 | DMEA Thiourea TOFA | | 3.5 0.2 5.0 |
| | STORED AT ABOUT 38° to 41° C. | | | STORED AT ABOUT 38° 20 to 41° C. | | |
| | Initial | 19 days | 41 days | Initial | 19 days | 31 days |
| Cream time (secs.) | 13 | 13 | 14 | 13 | 12 | 13 |
| Gel time (secs.) | 40 | 39 | 45 | 38 | 36 | 40 |
| Tack-free (secs.) | 59 | 54 | 61 | 59 | 46 | 52 |
| Rise (secs.) | 93 | 85 | 101 | 91 | 85 | 91 |
| Activity loss, % | | | | | | |
| Cream time | — | 0 | 8 | — | 0 | 0 |

TABLE 5-continued

|  | Run #16 |  | Run #17 |  |
|---|---|---|---|---|
| Gel time | — | 0 13 | — | 0 5 |
| Tack-free time | — | 0 3 | — | 0 0 |
| Rise time | — | 0 9 | — | 0 0 |

The premix composition of Run #16 with thiourea and DABCO R-8020, but without TOFA at 45° C. lost half of original activity in 14 days of storage.

The premix composition of Run #17 with DMEA but without the TOFA and thiourea stabilizer showed a calculated average loss in activity of over 20% when stored for 21 days at about 41° to 43° C.

The tall oil fatty acid composition employed in the foregoing runs (Examples 1 and 2) was ACINTOL® FA3, a commercial product supplied by Arizona Chemical Company. The product typically contains 98.8% total fatty acids and 0.5% rosin acids. The fatty acid composition is composed of:

|  | % by wt |
|---|---|
| Non-conjugated (linoleic) | 38 |
| Conjugated (linoleic) | 7 |
| Oleic | 50 |
| Stearic | 2 |
| Other fatty acids | 3 |

The indicated loss in activity on storage of unstabilized halogenated polyol-containing compositions for production of flame retardant polyurethane foam products was observed not only with the particular tertiary amine catalysts reported in the examples above but is a common occurrence with such premix compositions containing other tertiary amine catalysts used alone or in combination with a tin co-catalyst.

In a series of tests made with such premix compositions containing Polycat 8 as a catalyst, the loss in activity after 8 and 15 days storage at 45° C., was as follows as compared to the stabilized composition containing the synergistic combination of the present invention.

TABLE 6

|  | Run #18 |  | Run #19 |  |
|---|---|---|---|---|
|  |  | pbw |  | pbw |
|  | Polycat-8 | 2.5 | Polycat-8 | 2.5 |
|  |  |  | *Pennzone-L | 0.1 |
|  |  |  | Allo-ocimene | 3.0 |
|  | Initial |  | Initial |  |
| Cream time (secs.) | 11 |  | 12 |  |
| Gel time (secs.) | 32 |  | 33 |  |
| Rise time (secs.) | 43 |  | 39 |  |
| Tack-free time (secs.) | 57 |  | 63 |  |
|  | After 15 days Storage at 45° C. |  | After 14 days Storage at 47.2° C. |  |
| Cream time (secs.) | 12 |  | 18 |  |
| Gel time (secs.) | 64 |  | 56 |  |
| Rise time (secs.) | 120 |  | 80 |  |
| Tack-free time (secs.) | 147 |  | 117 |  |

*Pennzone-L is an alkyl substituted thiourea marketed by Pennwalt Chemical Co.

Polycat-8 is a catalyst for polyurethane consisting essentially of N,N-dimethyl cyclohexylamine, supplied by Abbott Laboratories.

As seen from the data in Table 6, while there was a small loss in cream time (6 seconds) on storage of the stabilized premix, there was considerably less loss in activity as to gel time, rise time and tack-free time in the stabilized mixture. Better stabilization of Polycat-8 is obtained when using as stabilizer a mixture of thiourea and TOFA as shown in the example below.

EXAMPLE 3

| The premix composition used in this example comprised: |  |
|---|---|
|  | pbw |
| 93% Thermolin RF-230 plus 7% Genetron R11S-BA | 107.5 |
| Poly G-70-600 | 20.0 |
| LK-221 | 1.5 |
| Polycat-8 | 2.5 |
| Stabilizer Additives | (as shown) |
| Mondur MR (later added) | 134. |

The tests were conducted before and after storage at 105°–110° F. (=40.6°0 to 43.3° C.) for the periods indicated. The results obtained are reported in Table 7 below:

TABLE 7

| STABILIZER ADDITIVES | Run #20 No Stabilizer | | Run #21 Thiourea 0.1+ Allo-ocimene 3.0 | | | Run #22 0.1+ 5.0 | | | Run #23 0.1+ 7.0 | | | Run #24 0.1+ 10.0 | | |
|---|---|---|---|---|---|---|---|---|---|---|---|---|---|---|
| DAYS | 0 | 15 | 0 | 7 | 14 | 0 | 7 | 14 | 0 | 7 | 14 | 0 | 7 | 14 |
| Cream time (secs.) | 11 | 14 | 12 | 13 | 16 | 13 | 14 | 16 | 12 | 13 | 18 | 13 | 17 | 17 |
| Gel time (secs.) | 27 | 27 | 30 | 36 | 43 | 32 | 37 | 44 | 31 | 37 | 43 | 34 | 40 | 43 |
| Tack-free time (secs.) | 38 | 60 | 35 | 45 | 57 | 37 | 45 | 58 | 38 | 46 | 58 | 37 | 49 | 58 |
| Rise time (secs.) | 59 | 94 | 65 | 78 | 96 | 67 | 82 | 90 | 66 | 85 | 95 | 69 | 99 | 93 |
| Activity loss, % |  |  |  |  |  |  |  |  |  |  |  |  |  |  |
| Cream time | — | 21 | — | 8 | 33 | — | 8 | 23 | — | 8 | 50 | — | 31 | 31 |
| Gel time | — | 37 | — | 20 | 43 | — | 16 | 38 | — | 19 | 39 | — | 18 | 26 |
| Tack-free time | — | 58 | — | 29 | 63 | — | 22 | 57 | — | 21 | 53 | — | 30 | 57 |
| Rise time | — | 59 | — | 20 | 48 | — | 22 | 34 | — | 29 | 44 | — | 43 | 35 |

| STABILIZER ADDITIVES | Run #25 Thiourea 0.1+ TOFA 3.0 | | | Run #26 0.1+ 5.0 | | | Run #27 0.1+ 7.0 | | | Run #28 0.1+ 10.0 | | |
|---|---|---|---|---|---|---|---|---|---|---|---|---|
| DAYS | 0 | 7 | 14 | 0 | 7 | 14 | 0 | 7 | 14 | 0 | 7 | 14 |
| Cream time (secs.) | 15 | 16 | 17 | 19 | 21 | 21 | 23 | 23 | 23 | 25 | 25 | 28 |
| Gel time (secs.) | 39 | 44 | 52 | 49 | 54 | 59 | 59 | 62 | 69 | 70 | 72 | 78 |
| Tack-free time (secs.) | 48 | 59 | 71 | 63 | 73 | 85 | 78 | 90 | 99 | 91 | 102 | 113 |
| Rise time (secs.) | 80 | 101 | 110 | 99 | 116 | 123 | 123 | 140 | 150 | 145 | 156 | 190 |
| Activity loss, % |  |  |  |  |  |  |  |  |  |  |  |  |

TABLE 7-continued

| | | | | | | | | | | | |
|---|---|---|---|---|---|---|---|---|---|---|---|
| Cream time | — | 7 | 13 | — | 11 | 5 | — | 0 | 0 | — | 0 | 12 |
| Gel time | — | 13 | 33 | — | 10 | 20 | — | 5 | 17 | — | 3 | 11 |
| Tack-free time | — | 23 | 48 | — | 16 | 35 | — | 15 | 27 | — | 23 | 24 |
| Rise time | — | 26 | 38 | — | 17 | 24 | — | 14 | 22 | — | 8 | 31 |

With a wide number of different tertiary amine catalysts, the basic premix composition of Table 1 was tested for storage stability respectively with and without (controls) inclusion of the activity stabilizers of the present invention. The results are summarized in Table 8 below:

TABLE 8

Storage at 40–43° C. for 21 days*

| Type of Catalyst | Tertiary Amine Catalyst, pbw | Stabilizers, pbw | | Improvement over Control, After Storage* | | | |
|---|---|---|---|---|---|---|---|
| | | Thio-urea | Allo-ocimene | Cream time | Gel time | Tack-free time | Rise time |
| Niax A-4[1] | 10.0 | 0.5 | 5.0 | yes | slight | yes | yes |
| Diethanolamine[2] | 8.0 | 0.4 | 5.0 | yes | no | no | no |
| Triethanolamine[3] | 20.0 | 1.0 | 5.0 | yes | no | yes | yes |
| DM-70[4] | 5.0 | 0.25 | 5.0 | yes | yes | yes | yes |
| TAP[5] | 3.5 | 0.2 | 5.0 | no | yes | no | no |
| DMP[6] | 4.0 | 0.2 | 5.0 | no | yes | yes | yes |
| THANCAT-DD[7] | 3.5 | 0.2 | 5.0 | yes | yes | no | yes |
| Baircat B-16[8] | 6.0 | 0.3 | 5.0 | yes | yes | yes | yes |
| DABCO 33LV[9] | 3.5 | 0.2 | 5.0 | no | no | no | no |
| TMBDA[10] | 2.5 | 0.13 | 5.0 | yes | yes | yes | yes |
| DABCO-T[11] | 3.5 | 0.2 | 5.0 | yes | yes | yes | yes |
| NIAX A-1[12] | 2.5 | 0.13 | 5.0 | no | no | no | no |
| TMEDA[13] | 2.5 | 0.13 | 5.0 | yes | yes | yes | yes |
| TEA[14] | 2.5 | 0.13 | 5.0 | yes | yes | yes | yes |

[1] Niax A-4 is 35% N,N-dimethyl, N'N'-dimethyl aminopropioamide and 65% ethoxylalkyl phenol type solvent and was aged 21 days in the control (without stabilizer) and 22 days with stabilizer.
[2] Diethanolamine is a secondary amine and is included to show that the stabilizers of this invention are not effective with other than tertiary amines.
[3] Triethanolamine is a tertiary amine which is effective in the stabilizers of this invention.
[4] DM-70 is composed of 33% N,N-dimethyl piperazine;
  2% 2-(morpholinoethoxy)-ethanol
  65% [2-(morpholino)-ethyl] ether.
[5] TAP is trimethylaminoethyl piperizine.
[6] DMP is dimethyl piperazine.
[7] Thancat DD is N,N-dimethylaminoethyl-N',N'-dimethylaminopropyl ether.
[8] Baircat B-16 is dimethyl cetyl amine.
[9] DABCO 33 LV is composed of 33 wt. % triethylene diamine and 67 wt. % dipropylene glycol.
[10] TMBDA is tetramethyl butane diamine.
[11] DABCO-T is trimethyl aminoethyl ethanolamine.
[12] NIAX A-1 comprises 70% bis-(2-dimethyl amino ethyl) ether in propylene glycol.
[13] TMEDA is tetramethyl ethylene diamine.
[14] TEA is triethylamine.

The more important criteria to be considered in a review of the results of Table 8 is the rate of loss in activity as to gel time after storage. The Table 8 data indicates that at least some improvement in storage stability was obtained with the activity-stabilized premix compositions of this invention as to all of the tertiary amine catalysts tested except in the cases of triethanolamine, Dabco 33LV catalyst and NIAX A-1 under the conditions of the experiment. As to these, however, it should be noted, that the tertiary amines in Dabco 33LV and NIAX A-1 were dissolved in dipropylene glycol, which solvent may interfere with the stabilizing effect of the particular combination of sulfur compound and unsaturated carbon compound employed in the reported tests. In the case of triethanolamine, the initial activity of the catalyst is comparatively low in all respects, and remains low after storage with or without addition of the activity stabilizer; it is not among the catalysts recommended for use alone (without active co-catalyst) in the production of fire-retardant polyurethane cellular products.

In runs made on a premix having the same formulation as in Example 1, significant improvement in storage stability was obtained using an activity stabilizer composed of thiourea and dimethyl hexynediol, with DMEA and DABCO R-8020, respectively, as catalyst. When using these same catalysts in separate runs, with thiourea and SURFYNOL 61 surfactant (3,5,dimethyl-1-hexyne-3-ol) together as the activity stabilizer, improved storage stability was also obtained. All of these premix compositions were tested before and after storage for 14 days at 38° to 40° C.

Compositions employing a tin catalyst in combination with tertiary amine generally have a comparatively high activity. Any of the organotin compounds which have been found to increase the activity of tertiary amine catalysts can be used in amounts ranging from 0.01 to about 0.5 parts by weight per hundred parts of chlorinated polyether in the premix composition. Examples of such compounds include stannous octoate, stannus oleate, dibutyltin dilaurate, dibutyltin di-2-ethyl-hexoate and dibutyltin diacetate. In runs made on a premix having substantially the same formulation as Run #4 of Example 1, the improvement in activity with the addition of 0.2 parts by weight dibutyltin diacetate was as follows:

Activity gain, %
Cream time 150
Gel time 230
Tack-free time 258

Rise time 219

While flame resistant premix compositions based on halogenated polyether polyol containing such co-catalyst combinations decline in activity on storage at a lower rate in general than those using only tertiary amine catalyst, the addition thereto of the activity stabilizing components of the invention would prove beneficial, particularly if extended storage is expected.

In preparation of the activity-stabilized premix compositions of the invention only the usual amounts of tertiary amine catalyst need be employed as in the known formulations for rigid polyurethane products. The unsaturated carbon compound and sulfur compound together with the tertiary amine catalyst will in general comprise 5 to 10 parts by weight per hundred parts of chlorinated polyether in the premix composition.

What is claimed is:

1. A premix composition prepared for admixture with an isocyanate to form rigid flame-retardant polyurethane products, said premix composition comprising:
   (a) halogenated polyol;
   (b) tertiary amine catalyst;
   (c) organic blowing agent;
   (d) cell stabilizer;
   (e) organic sulfur compound selected from the group consisting of thiourea or thiocarbamate compounds; and
   (f) at least one unsaturated carbon compound selected from the group consisting of unsaturated hydrocarbons, unsaturated higher fatty acids, and unsaturated higher fatty and polyester alcohols.

2. A premix composition according to claim 1 wherein said organic sulfur compound is a thiourea compound selected from the group consisting of thiourea, alkylthiourea, and alkylthiourea disulfide.

3. A premix composition according to claim 1 wherein said organic sulfur compound is a thiocarbamate compound selected from the group consisting of thiocarbamate and salts of thiocarbamate.

4. Composition as defined in claim 1 wherein said unsaturated carbon compound is an unsaturated higher fatty acid.

5. Composition as defined in claim 1 wherein said unsaturated carbon compound is the mixture contained in tall oil fatty acids.

6. Composition as defined in claim 1 wherein said carbon compound is an unsaturated acyclic terpene.

7. Composition as defined in claim 1 wherein said carbon compound is allo-ocimene.

8. A premix composition for preparation of rigid polyurethane flame retardant foam products comprising chlorinated polyether polyol, amino polyol, halohydrocarbon blowing agent, cell stabilizer and tertiary amine catalyst, said composition further containing as activity stabilizing agent a synergistic combination of thiourea and an unsaturated carbon compound, said activity stabilizing agent combination together with the tertiary amine catalyst being present in an amount of 5 to 10 parts by weight per hundred parts of chlorinated polyether polyol, said unsaturated carbon compound containing at least 8 carbon atoms in an olefinic hydrocarbon chain and being selected from the group consisting of unsaturated hydrocarbons, unsaturated higher fatty acids, unsaturated higher fatty alcohols and unsaturated polyester alcohols.

9. Premix composition as defined in claim 8 wherein said unsaturated carbon compound is an unsaturated acyclic terpene.

10. Premix composition as defined in claim 9 wherein unsaturated carbon compound is allo-ocimene.

11. Premix composition as defined in claim 8 wherein said tertiary amine catalyst comprises dimethyl ethanolamine.

12. Premix composition as defined in claim 11 wherein said unsaturated carbon compound is allo-ocimene.

13. Premix composition as defined in claim 11 wherein said unsaturated carbon compound comprises at least one unsaturated higher fatty acid.

14. Premix composition as defined in claim 13 wherein the unsaturated fatty acid compound is provided by a mixture of such acids as contained in tall oil fatty acid.

15. Premix composition as defined in claim 11 wherein said unsaturated carbon compound is oleic acid.

16. Premix composition as defined in claim 11 wherein said unsaturated carbon compound is linoleic acid.

17. Premix composition as defined in claim 11 wherein said unsaturated carbon compound is linolenic acid.

18. Premix composition as defined in claim 8 wherein said unsaturated carbon compound is provided by a drying oil containing one or more glyceride esters of higher fatty acids.

19. Premix compositions as defined in claim 8 comprising in parts by weight:

| | |
|---|---|
| Polychlorinated polyether polyol | 100 |
| Fluorochlorinated hydrocarbon blowing agent | 45 |
| Amino polyol | 20 |
| Liquid copolymer of N-vinyl pyrrolidone dibutyl maleate polymerized in trifunctional polyol | 1.5 |
| Teritary amine catalyst | 2.5 to 3.5 |
| Thiourea | 0.1 to 0.2 |
| Unsaturated carbon compound | 3.0 to 5.0 | said polychlorinated polyether polyol containing about 47% by weight of chemically bound chlorine, and having a hydroxyl number of 365±10 mg. KOH/gm and a viscosity of 100,000 cps. at 25° C.

20. Premix compositions as defined in claims 8 or 19 wherein an organotin compound is added in amounts in the range of 0.01 to about 0.5 parts by weight per hundred parts of chlorinated polyether polyol.

* * * * *